United States Patent [19]
Hembree

[11] 3,770,164
[45] Nov. 6, 1973

[54] SINGULATOR FOR SEEDS OR THE LIKE
[75] Inventor: Ralo L. Hembree, San Jose, Calif.
[73] Assignee: FMC Corporation, San Jose, Calif.
[22] Filed: Apr. 18, 1972
[21] Appl. No.: 245,076

[52] U.S. Cl. .............................................. 221/211
[51] Int. Cl. ............................................ B65g 47/14
[58] Field of Search .................... 221/211, 278, 160; 214/1 BS

[56] References Cited
UNITED STATES PATENTS
| | | | |
|---|---|---|---|
| 1,331,235 | 2/1920 | Bristow | 221/211 |
| 2,702,064 | 2/1955 | Lange | 221/160 X |
| 2,152,758 | 4/1939 | Cox | 221/211 X |
| 3,637,108 | 1/1972 | Loesch | 221/211 |

Primary Examiner—Stanley H. Tollberg
Attorney—F. W. Anderson et al.

[57] ABSTRACT

A singulator for small, lightweight articles such as lettuce seeds is disclosed for use in connection with a seed capsule assembly machine. The principle elements of the singulator are a hollow, rotatable drum, having a smooth periphery provided with conical cavities connected by restricted passageways to the drum interior. Means are provided for vacuumizing the drum interior, picking up seeds from the hopper surrounding the exterior of the drum and at the discharge location, the cavities successively are connected to a source of air under pressure discharging the seeds. Two air jets are provided for blowing off duplicate seeds picked up by the cavity so that only a single seed is discharged.

16 Claims, 12 Drawing Figures

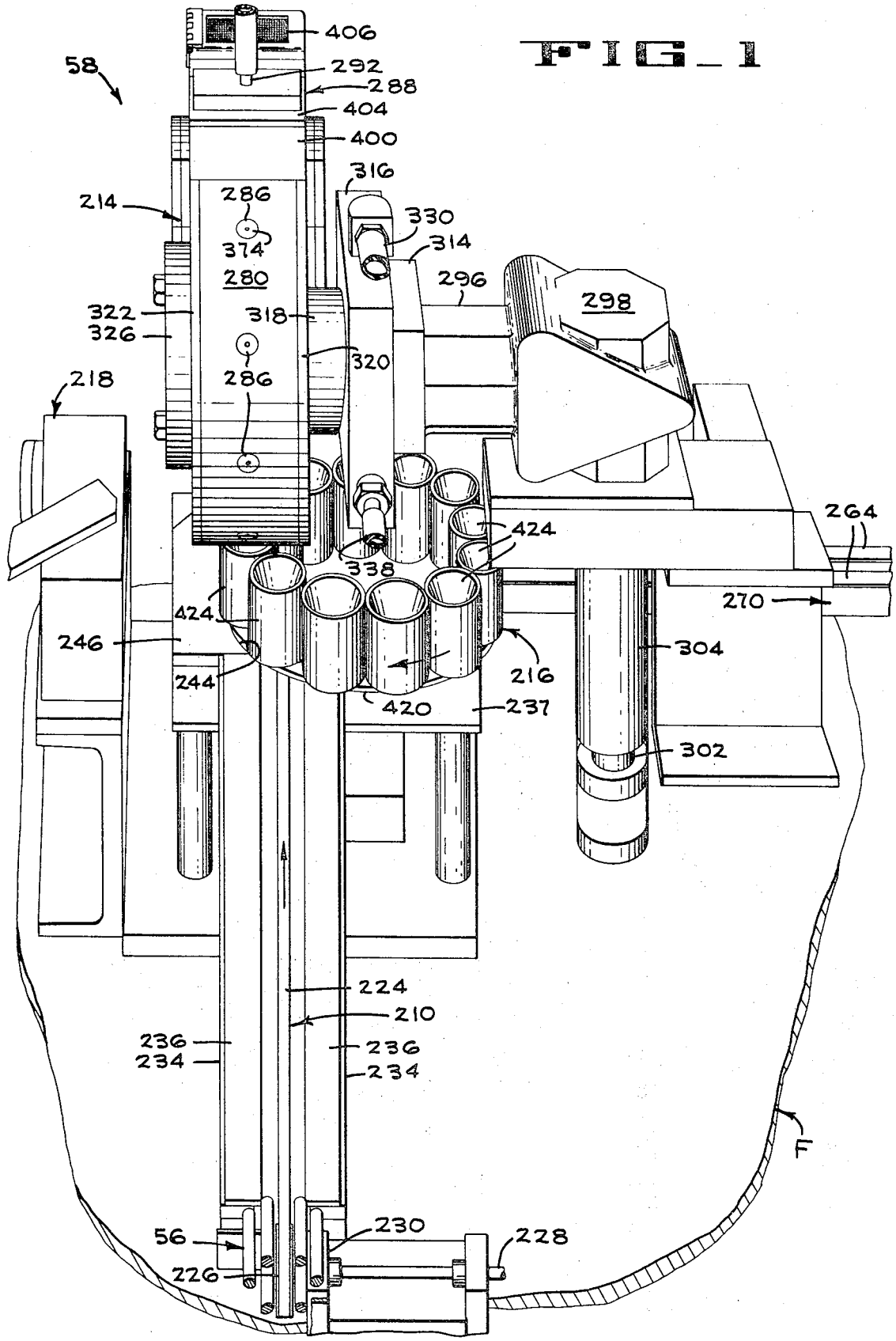
FIG_1

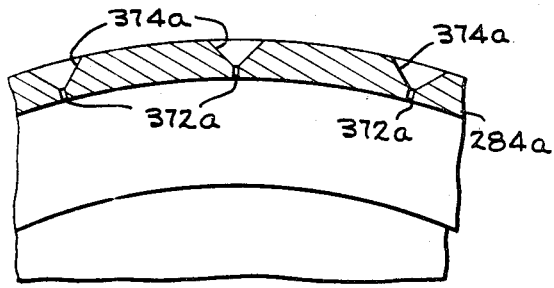
FIG_3A
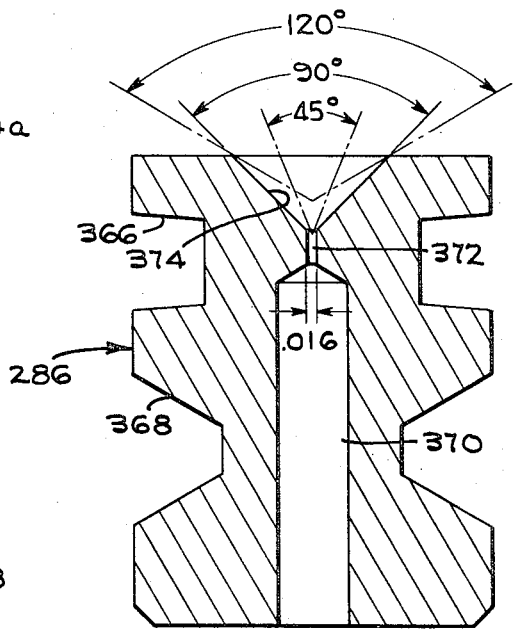
FIG_3
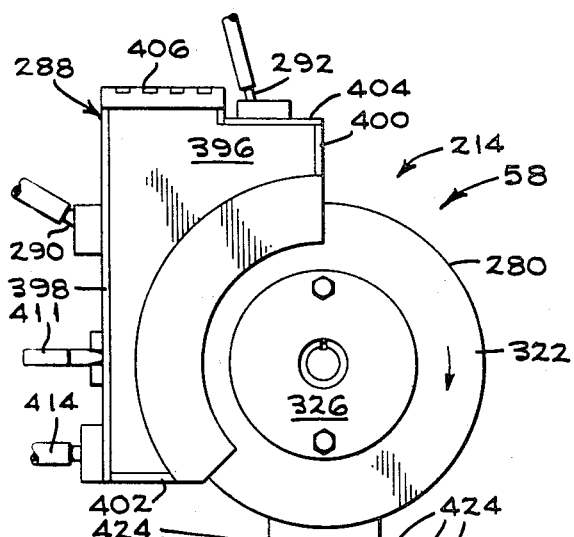
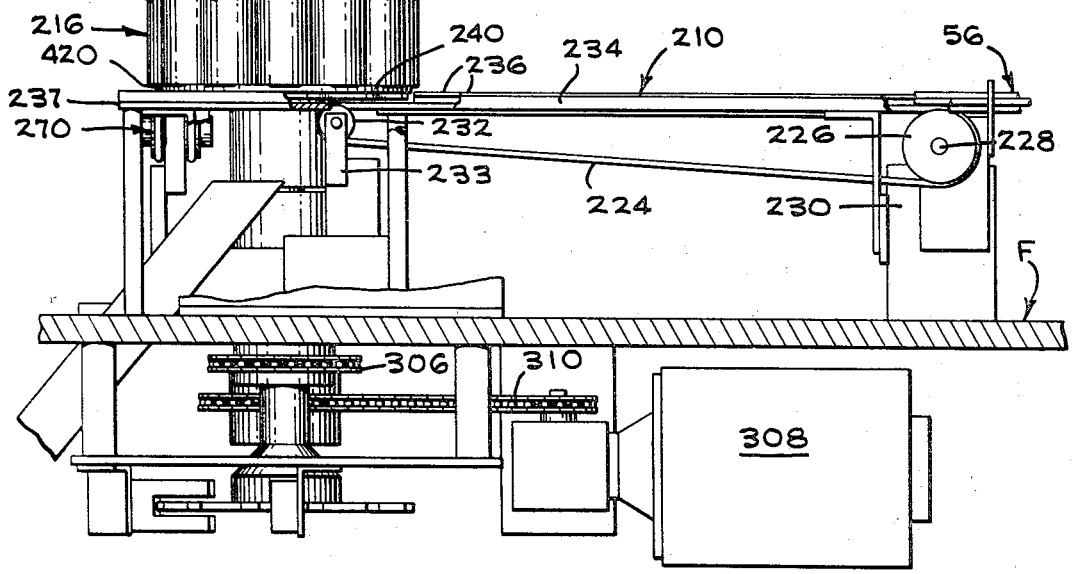
FIG_2

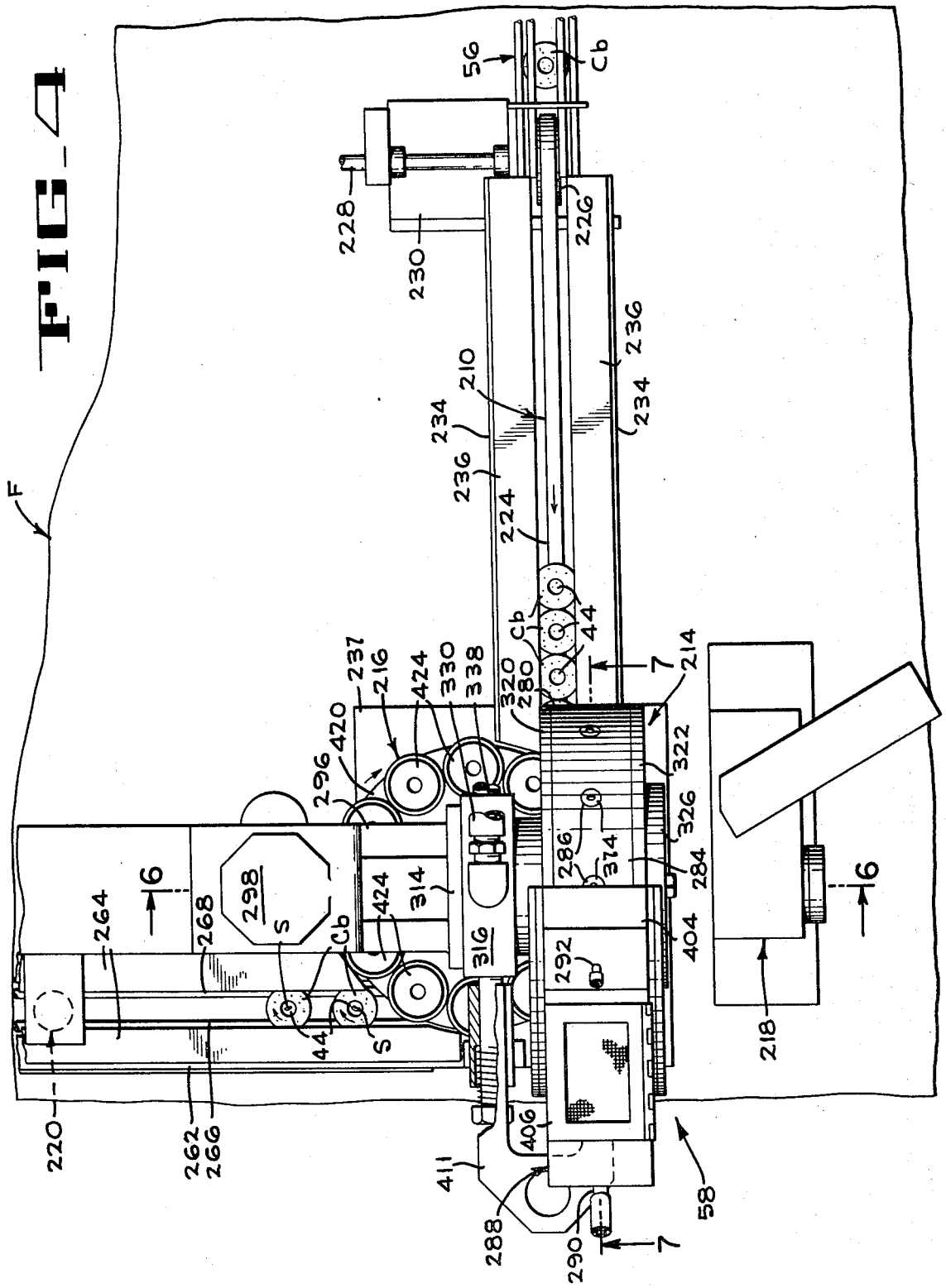

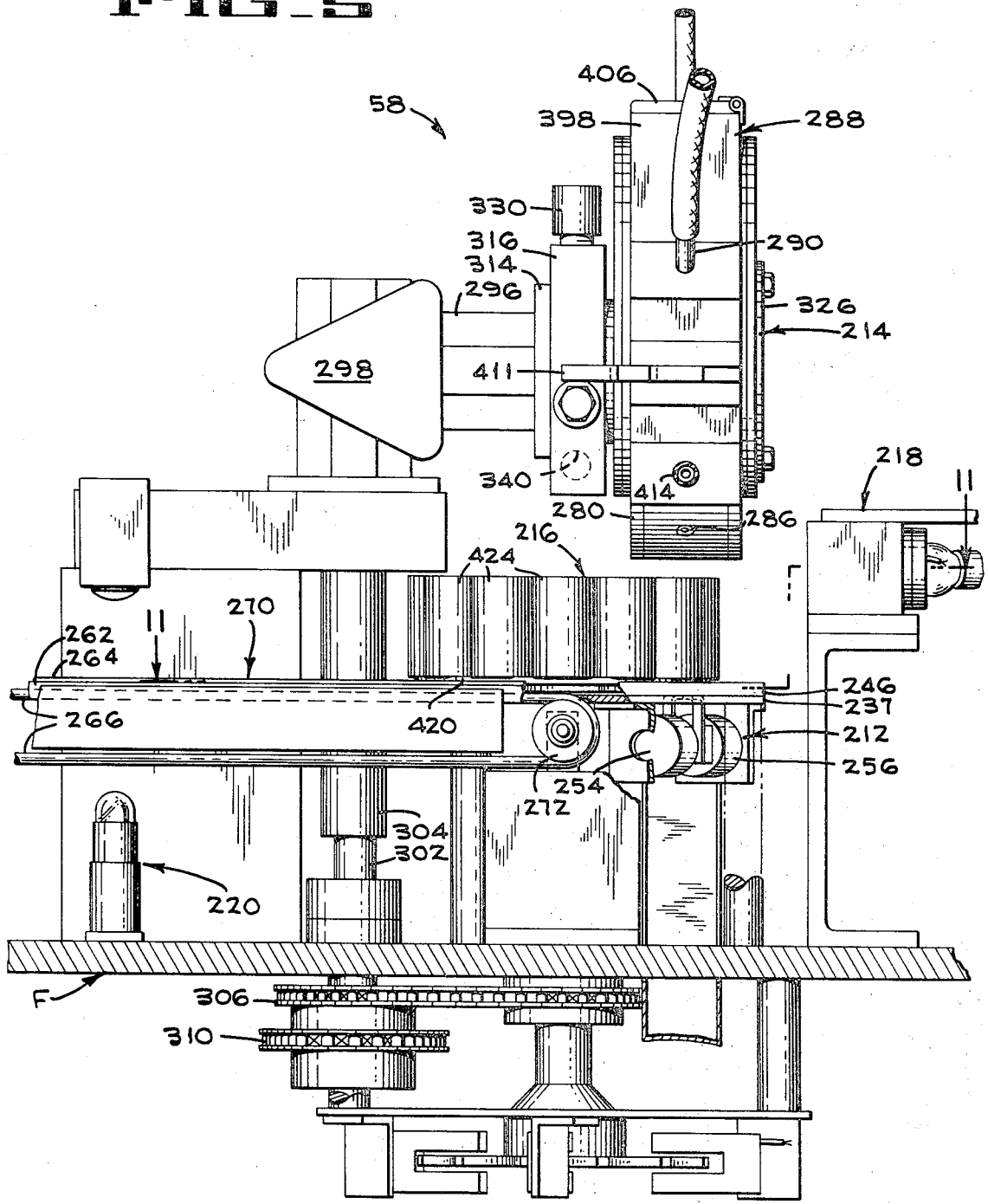

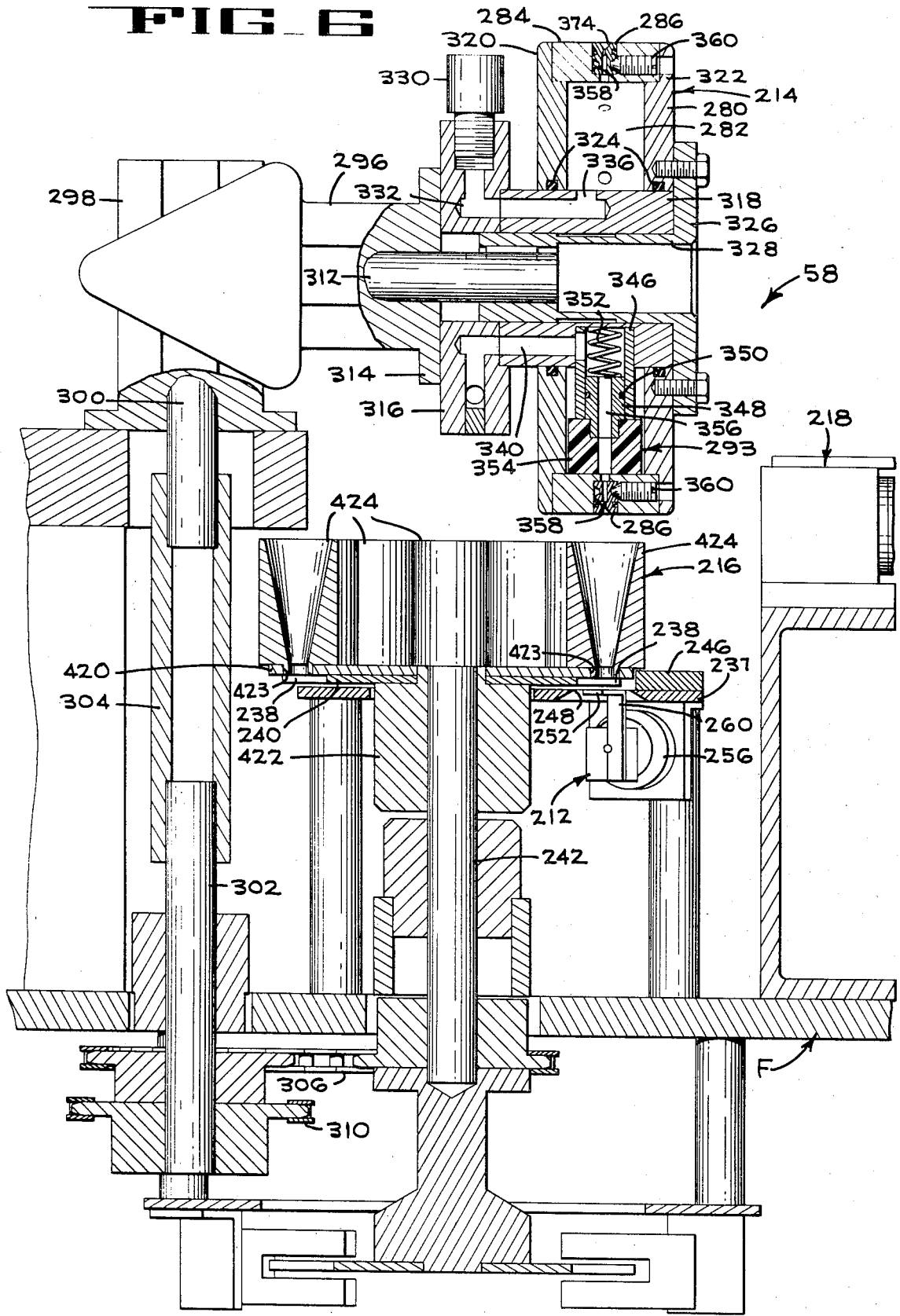

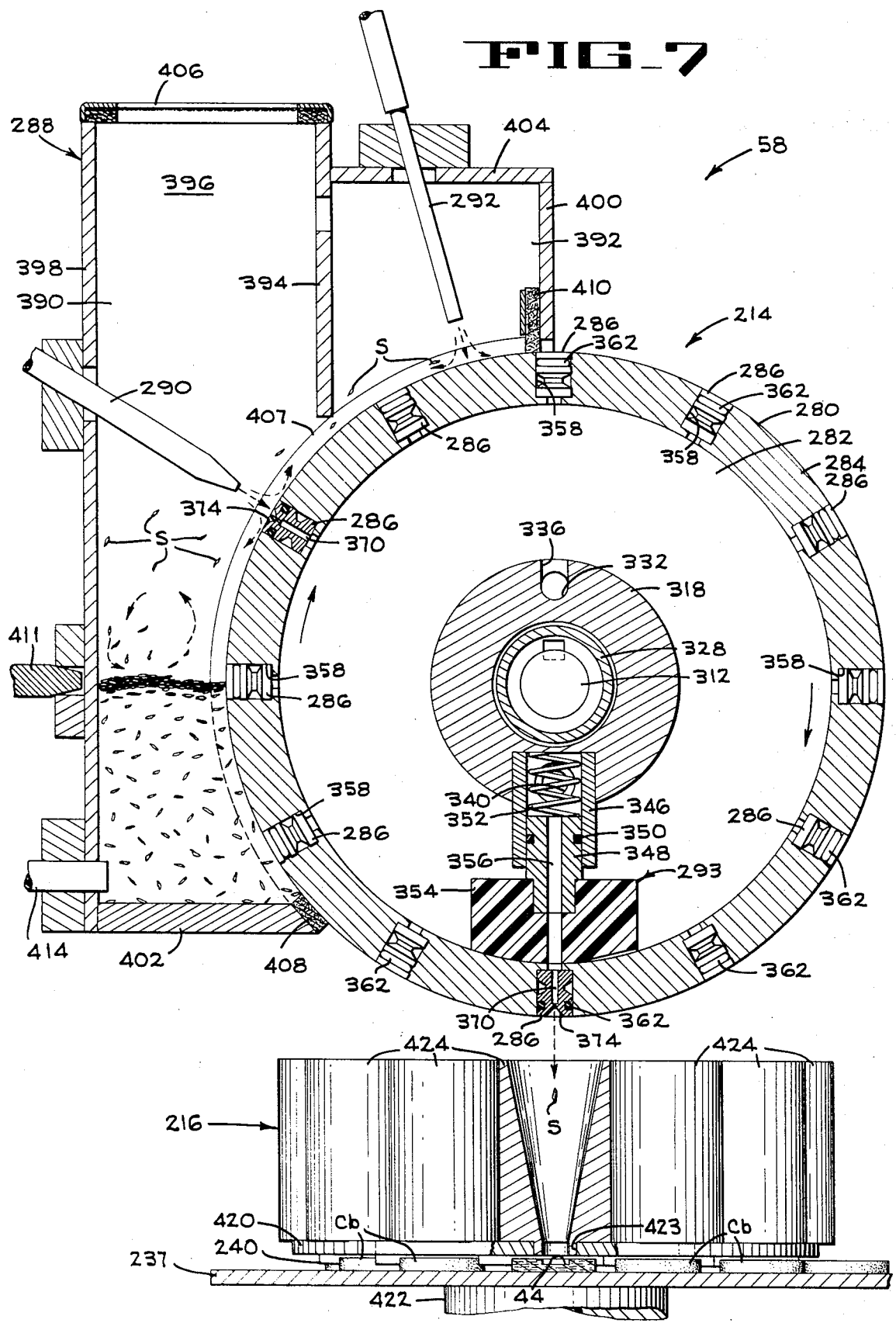

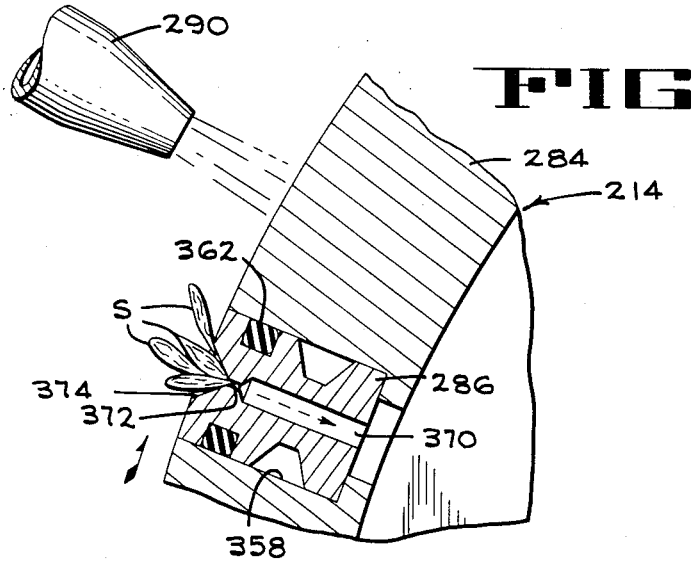
FIG_8
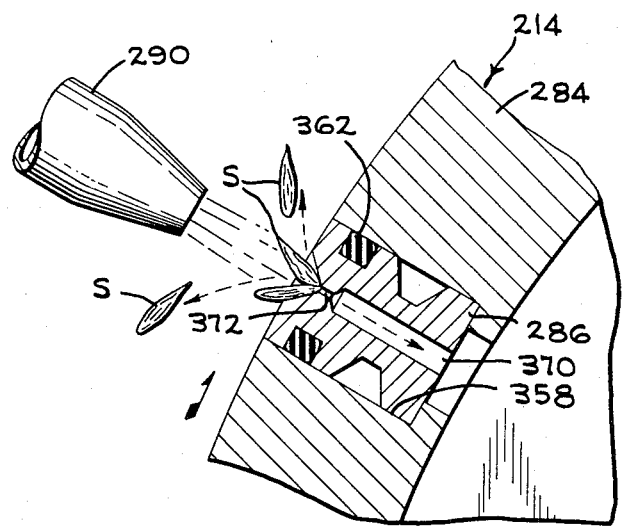
FIG_9
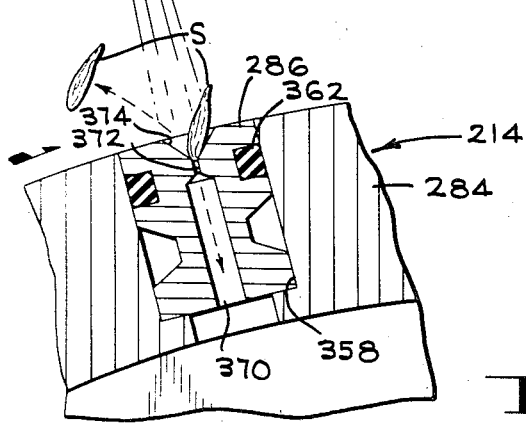
FIG_10

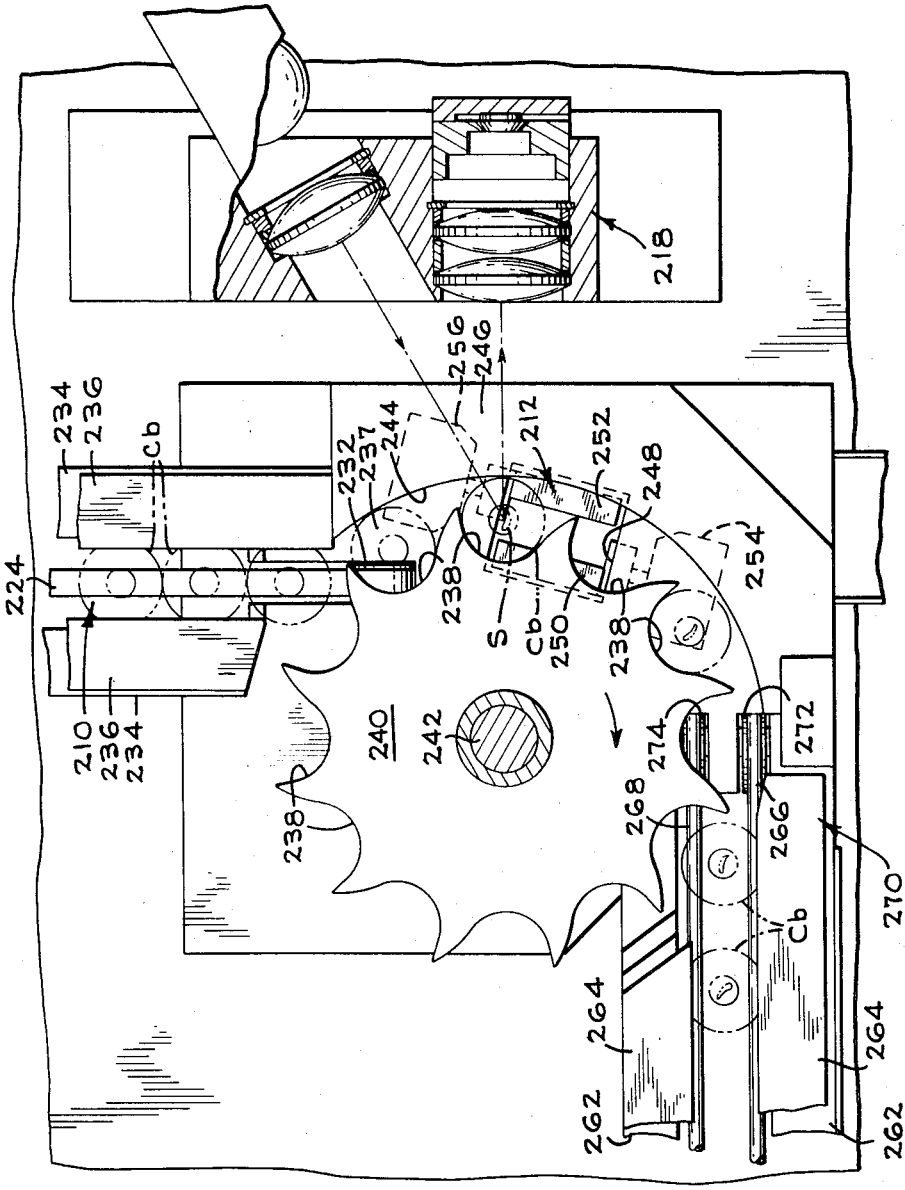

SINGULATOR FOR SEEDS OR THE LIKE

REFERENCE TO RELATED APPLICATIONS

The singulator of the present invention is disclosed for use in connection with a seed capsule assembly machine forming the subject matter of the copending United States application of Brink et al, Ser. No. 244,484 filed Apr. 17, 1972 and assigned to the FMC Corporation.

DESCRIPTION OF PRIOR ART

A rotatable hollow drum-type singulator for small articles wherein the drum is vacuumized for pickup and the pickup devices are subjected to air pressure for discharge of the articles is known. However, prior singulators of this type have employed hollow needles for picking up the articles and these have been found to be unsatisfactory for certain articles and particularly for articles such as lettuce seeds which are exceedingly light, small and of elongate form. In the United States Pat. to Loesch et al No. 3,637,108, Jan. 25, 1972, corn kernels or grain seeds are fed to the lower interior of a rotating drum. As the drum turns, positive air pressure within the drum retains the seeds in upwardly turning, inwardly facing conical cavities in the drum periphery (FIGS. 8 and 9). When the seeds are on top an air manifold 90 (FIG. 11) blows the seeds back into the drum and into a row of conduits 86a that direct the seeds to planter wheels.

SUMMARY OF THE INVENTION

The singulating drum of the present invention will singulate articles such as lettuce seeds or the like reliably and uniformly, which articles cannot be singulated by the prior devices such as the vacuumized, needle-bearing drums.

It has been found under the present invention that singulation of articles of the type described can be formed by forming the periphery of the vacuumized drum with a plurality of outwardly facing conical cavities with a restricted air passage connected between the apex of each cavity and the interior of the drum. By selecting dimensions for these elements in accordance with the teachings of the present invention, namely, selecting the included angle of the conical cavity and the diameter of the restricted air passage connected thereto, small light articles such as lettuce seeds or the like can be picked up in a manner which retains one article firmly. It usually happens that the cavities of the drum will pick up more than one article, but in view of the fact that one article is retained relatively firmly without entering the interior of the drum, under the present invention the extra articles, seeds or the like (referred to as "doubles") are readily dislodged by directing one or more air jets towards the cavities after they leave the pickup hopper.

Another feature of the present invention resides in the improved and simplified construction of the drum itself. The drum has a smooth peripheral flange and side flanges. It is mounted on a stationary hollow sleeve by means of its side flanges, these having O-ring seals on their inner peripheries. A drive shaft extends through the hub sleeve and has a flange on the outer end thereof that connects to one of the drum side flanges. The vacuum and air ports for the interior of the drum and for the article ejection station, respectively, are formed in the hub sleeve. The vacuum port connects to the interior of the drum and the air port connects to a sealing shoe and plunger system which confines the flow of air for ejecting the seed or articles to the zone at which discharge is to be effected. In accordance with the present invention when utilized with lettuce seeds, the pickup drum is formed with cavities having an included angle of about 90° with an operating range of 45° to 120°. The size of the air passage connecting the apex of each cavity to drum interior has also been found to be critical. Possibly when used for lettuce seeds or the like, this cavity has a diameter of about 0.016 inches for lettuce seeds, with an operable range of 0.0135 to 0.040 inches, depending upon the size of the articles being singulated. The depth of the conical cavity must also be carefully selected and for the use of the singulator being described, the 90° conical cavities preferred for lettuce seeds each have an axial depth of about 0.075 inches.

BRIEF DESCRIPTION OF THE DRAWINGS

FIG. 1 is an enlarged perspective illustrating the seed singulating and capsule loading mechanism.

FIG. 2 is a side elevation of the seed singulating and capsule loading mechanism.

FIG. 3 is an enlarged vertical section through one of the seed singulating cones illustrating the desired range of cone angles and also illustrating the preferred cone angle when singulating lettuce seeds.

FIG. 3A is a modified version of the seed singulating ring and seed singulating cone.

FIG. 4 is a plan of the seed singulating and capsule loading mechanism.

FIG. 5 is a front elevation of the seed singulating and capsule loading mechanism, certain parts being broken away to illustrate capsule reject gates.

FIG. 6 is an enlarged vertical section taken along lines 6—6 of FIG. 4.

FIG. 7 is an enlarged vertical section taken along lines 7—7 of FIG. 4 illustrating the mechanism for singulating and loading seeds into a capsule base.

FIGS. 8, 9 and 10 are progressive operational views illustrating the structure for blowing all but a single seed from the seed singulating cones.

FIG. 11 is a horizontal section taken along lines 11—11 of FIG. 5 illustrating the capsule base advancing star wheel and the seed detecting photoelectric sensor.

DETAILED DESCRIPTION

The seed singulating and capsule loading mechanism 58 of the present invention is illustrated in connection with the lettuce seed encapsulating machine of the aforesaid application of Brink et al. The mechanism is provided for singulating a single seed S (FIG. 7) from a bulk supply of seeds, and to load the single seed S into a cavity 44 in a capsule base or bottom Cb as it moves therepast. The mechanism 58 also includes means for rejecting capsule bases from the system in the event a seed S is not loaded into the capsule base and also in the event the accumulated supply of capsule bottoms loaded with seeds exceeds a predetermined maximum amount.

The mechanism 58 generally comprises a capsule bottom conveying system 210, a capsule bottom reject device 212, a seed singulator 214, and a capsule loading mechanism 216. The capsule base reject device 212 is controlled either by a seed detecting or inspecting photo-electric device 218 or a bottom oversupply accumulator photoelectric device 220.

More particularly, the capsule bottom conveying system 210 (FIGS. 1, 2, 4 and 11) receives capsule bottoms Cb from an accumulating feeder track 56 and directs the abutting capsule bottoms onto the upper run of a feed conveyor 224. The conveyor belt 224 is trained around a drive pulley 226 keyed to a drive shaft 228 (FIGS. 2 and 3) journaled on a bracket 230 secured to the frame F and an idler pulley 232 journaled on a bracket 233 mounted on the frame. While on the conveyor 224, the capsule bottoms Cb are guided by edge rails 234 (FIG. 4) and top rails 236.

The feed conveyor 224 advances the abutting capsule bottoms Cb over a deadplate 237 (FIG. 6) into pockets 238 of a star wheel 240 which is keyed to a shaft 242 journaled in the frame F and driven in the direction indicated by the arrows in FIG. 11. The star wheel 240 slidably advances the capsule bottoms over the deadplate 237 and between the pockets 238 and an arcuate edge guiding surface 244 of a guide plate 246. The deadplate 237 includes a discharge opening 248 (FIG. 11) in the path of movement of the capsule bottoms which discharge opening 248 is normally closed by a pair of reject gates 250 and 252 of the reject device 212 which normally allows the capsule bottoms to move therepast. The reject gates 250 and 252 are connected to the shafts of rotary solenoids 254 and 256 by arms 258 and 260 respectively, as best illustrated in FIGS. 6 and 11. A photoelectric detector 218 (FIG. 11) controls operation of the gates 250, 252 as explained in detail in the aforesaid copending application of Brink et al, this feature not forming part of the present invention.

The capsule bottoms Cb which move past the gates 250 and 252 in their normal path of travel slide off the deadplate 237 between pairs of spaced edge guiding rails 262 (FIGS. 4 and 11) and cover guide rails 264 secured thereto and to the frame F. As the capsule bottoms advance along the deadplate 237, they become supported upon two spaced endless belts 266 and 268 of a base accumulator conveyor 270 which belts are trained around pulleys 272 and 274 (FIG. 11) journaled on the frame. The belts 266 and 268 are driven in the direction of the arrows, but are driven at different speeds so that the capsule bottoms Cb will rotate as indicated in FIG. 4 causing broken capsule halves to separate and fall between the belts 266 and 268 for discharge from the system. The conveyor 270 likewise forms subject matter of the aforesaid copending application.

The seed singulator 214 (FIGS. 1–10) comprises a driven vacuum singulating drum or wheel 280 (FIGS. 6 and 7) having a vacuum chamber 282 partially defined by a smooth, annular peripheral flange or ring 284 of the wheel. The seed pick up devices are in the form of a plurality of single seed orifice plugs or suction nozzles 286 and are disposed at equal intervals around the ring 284. The singulating wheel ring 284 defines one wall of a bulk seed hopper 288 and is driven relative thereto for first drawing seeds into the conical suction nozzles 286 and thereafter moving the nozzles 286 past air blow-off pipes 290 and 292 which blow all but one seed out of each suction nozzle. Continued rotation of the wheel moves the nozzles into registration with a single seed blow-off device 293 wherein the single seed S in each nozzle is blown by air under pressure into the loading mechanism 216.

More particularly, the seed singulator 214 is mounted on the housing 296 (FIGS. 5 and 6) of a right angle gear box 298 which is secured to the frame F. The gear box 298 includes an input shaft 300 coupled to a drive shaft 302 by a sleeve 304. The drive shaft is connected in driving engagement to the shaft 242 of the starwheel 240 by a chain drive 306, and is connected to a variable speed motor 308 by a chain drive 310 thus driving the seed singulator 214 and the capsule advancing starwheel 240 in timed relationship. The gear box 298 includes an output shaft 312 (FIG. 6) which projects outwardly from a flanged end portion 314 thereof. A stationary hub sleeve 316 that also serves as an air and vacuum manifold is rigidly secured to the flanged portion 314 of the gearbox 298 and includes a tubular neck 318 which projects outwardly thereof for rotatably supporting the singulating wheel or drum 280.

The singulating wheel 280 (FIG. 6) comprises the peripheral flange 284 which is rigidly secured in flanged end or side walls 320 and 322, as by bolting. The inner edges of the walls 320 and 322 are rotatably received on the hub sleeve 318 and are sealed in air tight engagement thereto by O-rings 324 fitted in grooves in the inner edges of the drum side walls 320, 322. A flanged bushing 326 is rigidly connected to the outer wall 322 of the wheel as by bolting and includes a tubular sleeve 328 which is journaled within the neck 318 and is keyed to the output shaft 312 of the gearbox 298.

As best shown in FIGS. 1 and 6, the manifold 316 is connected to a source of vacuum preferably at about 8–10 inches of mercury by a conduit 330 which communicates with the vacuum chamber 282 in the singulating wheel 280 through conduit 332 and port 336. However, a vacuum within the range of about 6–25 inches of mercury has been used successfully. Similarly, an air supply conduit 338 is connected between the manifold 316 and a source of air, preferably at about ½ to 1 psig. However, when operating under increased vacuum, a blow-off pressure within the range of about 1–4 psig has been used successfully. The air flows from the conduit 338 through passage 340 in the manifold to the single seed blow-off device 293.

The single seed discharge or blow-off device 293 is disposed within the vacuum chamber 282, and includes a cylinder or sleeve 346 (FIGS. 6 and 7) which communicates with the passage 340 and is rigidly secured in a bored portion of the hub sleeve 318. A plunger or piston 348 is slidably received in the sleeve 346 and is sealed thereto by an O-ring 350. The piston 348 is urged downwardly by a spring 352 and has its lower end secured in an arcuate sealing shoe 354, preferably of plastic such as Teflon or Nylatron. A passage 356 through the piston 348 and sealing shoe 354 communicates with the blow-off air in the passage 340 of the sleeve 346 and registers with each seed suction nozzle 286, in turn, as the nozzles move therepast to blow the single seed S out of each nozzle as illustrated in FIG. 7. The shoe 354 bears against the inner surface of the ring 284 with sufficient force to provide a seal between the low pressure air in the vacuum chamber 282 and the air at superatmospheric pressure within the blow-off device 293.

As illustrated in FIG. 6, each of the suction nozzle plugs 286 is held in a counterbored port 358 in the ring 284 by a setscrew 360, and is sealed to the port by an O-ring 362 (FIG. 7). Each nozzle plug 286 (FIG. 3) includes a first annular groove 366 to receive the O-ring 362, and a second annular groove 368 to receive the associated set screw 360. A relatively large diameter bore 370 leads to an orifice or restricted air passage 372, which when handling lettuce seeds is preferably about 0.016 inches in diameter. However, when handling other seeds such as cabbage, broccoli or cauliflower seeds which are round, the orifice diameter range may be within about 0.0135–0.040 of an inch.

As best seen in the enlarged view of FIG. 3, the restricted air passage 372 leads into a frusto-conical seed receiving cavity 374 having its walls preferably converging at an angle of about 90° when handling the lettuce seeds. The axial depth of the cavity 374 is about 0.075 inches and the length of the restricted passage 372 is about 0.025 inches. When handling other types of seeds such as cabbage, broccoli, or cauliflower seeds which are round, as mentioned above, it has been determined that the angle of convergence may vary between about 120° and 45°. It is apparent that if larger seeds or other articles are to be singulated, the diameter of the orifice 372 and the configuration of the seed receiving cavity 374 may be varied to accommodate the particular size seed or the article being singulated.

A modified form of the singulating wheel ring 284a is illustrated in FIG. 3A, wherein the ring is thinner in cross-section and the orifice 372a and seed receiving frusto-conical cavities 374a are drilled directly into the ring 284a. Such a singulating ring is ideally suited for use when encapsulating only one type of seed or other article. However, the basic cavity and air passage dimensions given above are utilized.

As previously mentioned, the seed singulating drum or wheel 280 defines one wall of the bulk seed hopper 288. The hopper 288 (FIGS. 4, 5 and 7) additionally comprises a main chamber 390 (FIG. 7) and a final blow-off chamber 392 separated by a vertical partition 394. The hopper 288 is defined by sidewalls 396, a front wall 398, a rear wall 400, a floor 402, a roof 404 covering the final blow-off chamber 392, and a hinged screen door 406 covering the main chamber. The door 406 will allow air to vent from the hopper 288 and may be opened to dump a bulk supply of seeds into the hopper. Arcuate felt strips 407 and felt end strips 408 and 410 are secured to the hopper sidewalls 396, floor 402 and rear wall 400 and bear against the rotating singulating wheel 280 to prevent seeds from escaping from the hopper. The hopper 288 is held in place by a spring loaded latch 411 (FIGS. 4, 5 and 7) that is connected between the manifold 316 and the hopper 288.

In order to prevent packing of the bulk supply of certain types of seeds, it is desirable to blow air through the seeds to prevent the seeds from clinging to each other. Such air treatment will hereinafter be referred to as "fluidizing" and is accomplished by directing air at about 1½ to 3 psig into the lower end of the hopper 288 from a supply conduit 414. It will be understood, however, that certain seeds such as lettuce seeds do not readily fluidize and accordingly when handling these seeds air is not directed into the lower end of the hopper.

As the singulating wheel 280 moves upwardly through the hopper and moves out of the bulk supply of seeds within the hopper, the vacuum within the vacuum chamber 282 draws a plurality of seeds S into the seed receiving cavity 374 of each vacuum nozzle 286 as indicated in FIG. 8. Continued upward movement of each nozzle 286 moves the nozzle past the first air blast pipe 290 (FIG. 7) where air preferably at about 14–16 inches of water gauge pressure blows most of the excess seeds S ("doubles") out of the seed receiving cavity 374 as illustrated in FIG. 9. Each nozzle 286 then moves past the second air blast pipe 292 wherein another blast of air preferably within the range of about 14–16 inches of water blows all but a single seed S from the nozzle cavity 374, which single seed completely blocks the air flow into the orifice 372 as indicated in FIG. 10. However, air within the range of between 10–30 inches of water has been used successfully and the pressure is dependent upon the vacuum applied to the drum.

The single seed S and nozzle 286 rotate with the wheel 284 until the passage through the nozzle 286 registers with the passage 356 in the blow-off device 293. At this time, the superatmospheric pressure within the nozzle 286 blows the single seed S from the singulating wheel 214 to the capsule loading mechanism 216.

The capsule loading mechanism 216 (FIGS. 4, 5 and 6) comprises a disc 420 that is disposed above and is connected to the capsule base starwheel 240 and to a hub 422 keyed to shaft 242. The disc 420 is provided with a plurality of apertures 423 disposed immediately above and concentric with each pocket 238 in the starwheel 240. A plurality of seed guiding open ended funnels on cones 424 are rigidly secured on the disc 420, with a funnel being aligned with each of the disc apertures 423, and also with the seed cavity 44 (FIG. 7) in the capsule bottom Cb aligned therebelow. Thus, each suction nozzle 286 drops its single seed S into the wide upper end of the associated funnel or cone 424, which cone guides the single seed down into the cavity 44 in the associated capsule bottom Cb.

In conclusion, experience with the singulator of the present invention has revealed that it reliably and uniformly singulates very small, light weight articles (such as lettuce seeds) with an efficiency heretofore not attainable by known singulating devices of this type.

Although the best mode contemplated for carrying out the present invention has been herein shown and described. It will be apparent that modification and variation may be made without departing from what is regarded to be the subject matter of the invention.

What I claim is:

1. Apparatus for picking up seeds or the like from a hopper, singulating them and depositing them in capsules, said apparatus being of the type comprising a hollow vacuumized drum, means mounting said drum for rotation, a row of seed pick up devices on the drum periphery having air passages leading to the drum interior, and means for supplying air to each drum aperture as it passes a delivery location for ejecting a seed; the improvement wherein said drum has a smooth peripheral wall, said seed pickup means each comprising an outwardly facing conical cavity in said drum wall and a restricted air passage connected between the apex of said conical cavity and the interior of the drum, and external air jet means directed towards said drum periphery for blowing all but one seed out of each cavity and externally of the drum.

2. The apparatus of claim 1 for handling seeds or the like of a size similar to that of lettuce, cabbage, broccoli or cauliflower seeds, wherein said conical cavities have an included angle of about 45° to 120° and are about 0.075 inches deep along their axes.

3. The apparatus of claim 2 for handling seeds of a size similar to that of lettuce seeds, wherein said included angle is about 90°.

4. The apparatus of claim 2, wherein said restricted air passage has a diameter of about 0.0135 to 0.040 inches.

5. The apparatus of claim 4 for handling seeds of a size similar to that of lettuce seeds, wherein said restricted air passage has a diameter of about 0.016 inches.

6. The apparatus of claim 4, wherein the drum vacuum is about 6 to 25 of mercury.

7. The apparatus of claim 6, wherein the drum vacuum is about 8 – 10 inches of mercury.

8. The apparatus of claim 1, wherein each of said seed pick up means further comprises a plug member containing said conical cavity and restricted air passage, lines in the drum periphery for receiving said plug members, means for sealing said plug members to their bores, and means for detachably securing said plug members in their bores.

9. The apparatus of claim 1, wherein said hopper enshrouds an upwardly turning sector of said drum, said air jet means comprising an air nozzle directed toward said conical cavities in the drum periphery above the level of seeds in the hopper, and means for supplying air to said nozzle for disloding all but one seed from each cavity.

10. The apparatus of claim 9, wherein said air nozzle is located inside said hopper but above the seed level therein.

11. The apparatus of claim 10, wherein said air nozzle is directed radially toward said drum periphery.

12. The apparatus of claim 11 for handling seeds or the like of a size similar to that of lettuce, cabbage, broccoli or cauliflower seeds, wherein said air nozzle receives air at about 14–16 inches of water, gauge pressure.

13. The apparatus of claim 10, comprising a second air nozzle downstream of said first named air nozzle directed toward said cavities for further dislodging doubles.

14. The apparatus of claim 13, including means for enshrouding said second air nozzle.

15. Apparatus for singulating seeds or the like comprising a hollow drum having side flanges and a peripheral flange, a row of seed pick up devices on said peripheral flange and having air passages leading to the drum interior, drum mounting means comprising a stationary hub sleeve, said drum side flanges making rotary sealing engagement with the hub sleeve, drive shaft means extending through said hub sleeve and having means on its outer end for connection to the outer drum side flange, and air and vacuum ports formed in said hub sleeve and connecting to the drum interior.

16. The apparatus of claim 15, comprising a radial cylinder extending from said hub sleeve and open to said air port, a spring advanced plunger slidable in said cylinder, means for sealing said plunger to the cylinder, an anti-friction shoe on the outer end of said plunger and slidably engaging the inner surface of said peripheral drum flange, and an air passage through said plunger and shoe for connection to said pick up devices.

* * * * *

UNITED STATES PATENT OFFICE
CERTIFICATE OF CORRECTION

PATENT NO. : 3,770,164
DATED : November 6, 1973
INVENTOR(S) : RALO L. HEMBREE

It is certified that error appears in the above-identified patent and that said Letters Patent are hereby corrected as shown below:

Col. 1, line 14, after "25" insert -- inches --.

line 29, change "disloding" to -- dislodging --.

Signed and sealed this 24th day of June 1975.

(SEAL)
Attest:

RUTH C. MASON
Attesting Officer

C. MARSHALL DANN
Commissioner of Patents
and Trademarks